Sept. 2, 1969     T. A. DONALDSON     3,464,908
APPARATUS FOR MEASURING HYDROGEN ION CONCENTRATION OF A SLURRY
Filed March 15, 1966     3 Sheets-Sheet 1
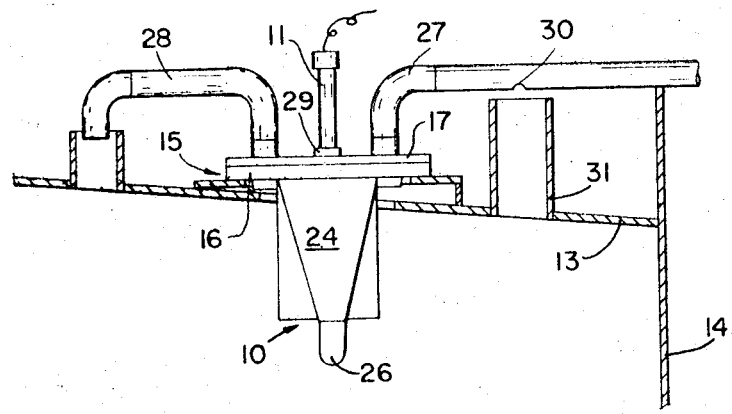
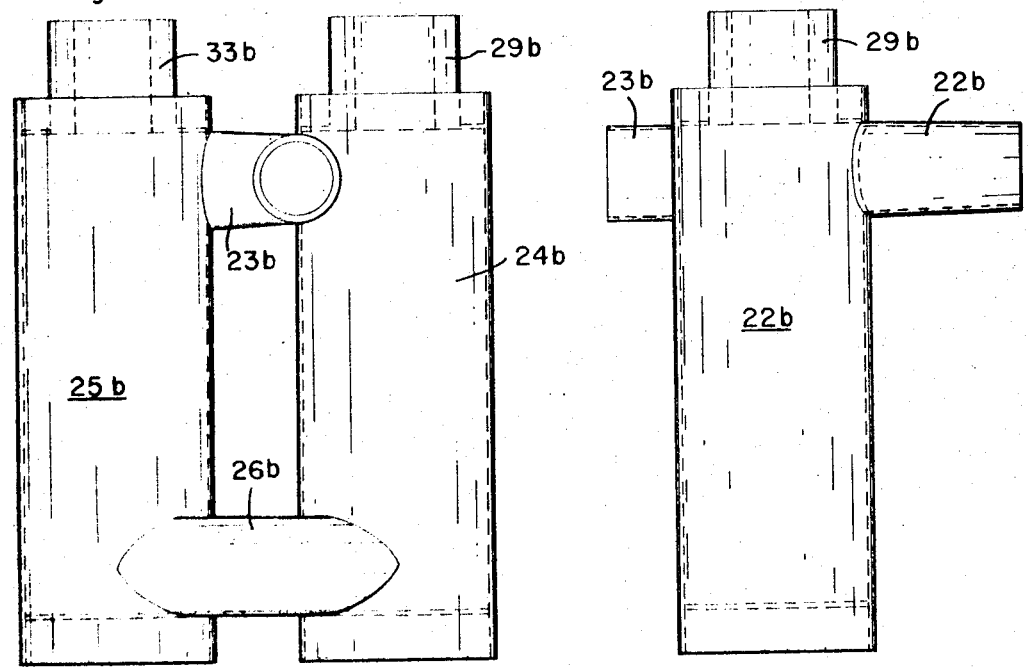
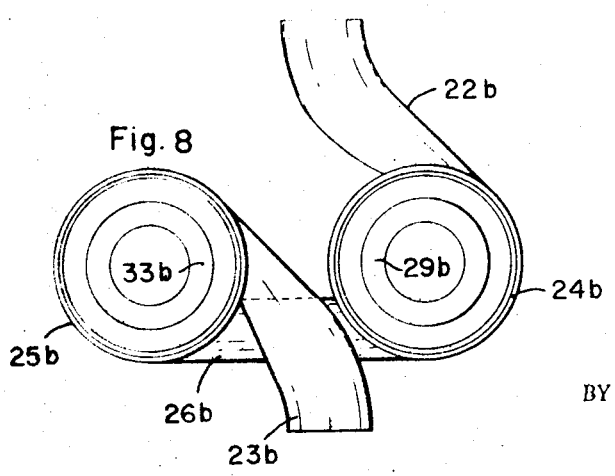
INVENTOR:
THOMAS A. DONALDSON
BY Brown & Rosen

United States Patent Office 3,464,908
Patented Sept. 2, 1969

3,464,908
APPARATUS FOR MEASURING HYDROGEN ION CONCENTRATION OF A SLURRY
Thomas Alexander Donaldson, Newark, Del., assignor to J. M. Huber Corporation, Locust, N.J., a corporation of New Jersey
Filed Mar. 15, 1966, Ser. No. 534,444
Int. Cl. B01k 3/04
U.S. Cl. 204—195                      1 Claim

ABSTRACT OF THE DISCLOSURE

Apparatus for measuring the hydrogen ion concentration of a slurry containing abrasive solids in which a spiral flow is provided so that the heavier particles are prevented from coming in contact with the electrode while the slower moving fine particles of the slurry scrub undesired coating from the electrode is disclosed.

---

The present invention relates to an apparatus useful in controlling a chemical process.

The primary object of the present invention is to provide a pH electrode pot in which the electrode is cleaned by the material being measured.

Another object of the invention is to provide a self cleaning pH electrode system having means for reducing abrasive wear on the electrode.

A further object of the invention is to provide a self cleaning pH electrode apparatus in which the life of the electrode is materially extended.

Figure 2:
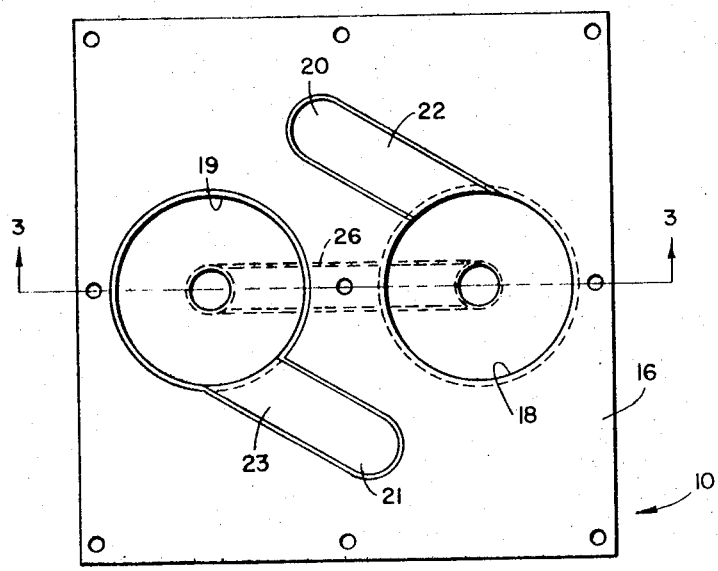
Figure 3:
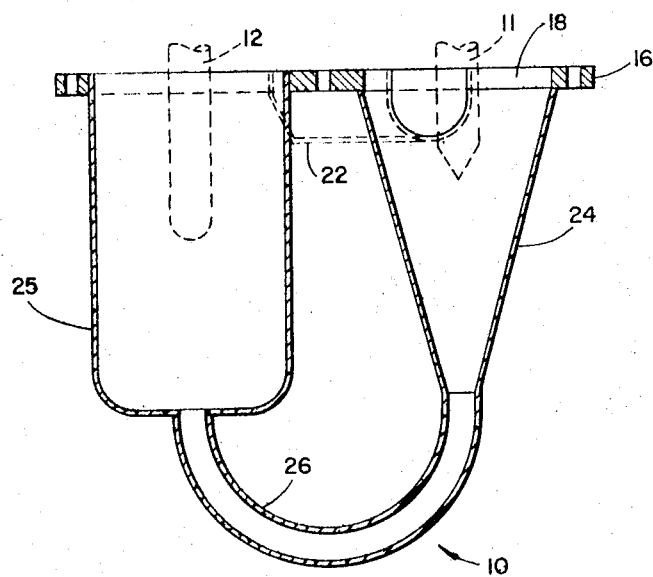
Figure 4:
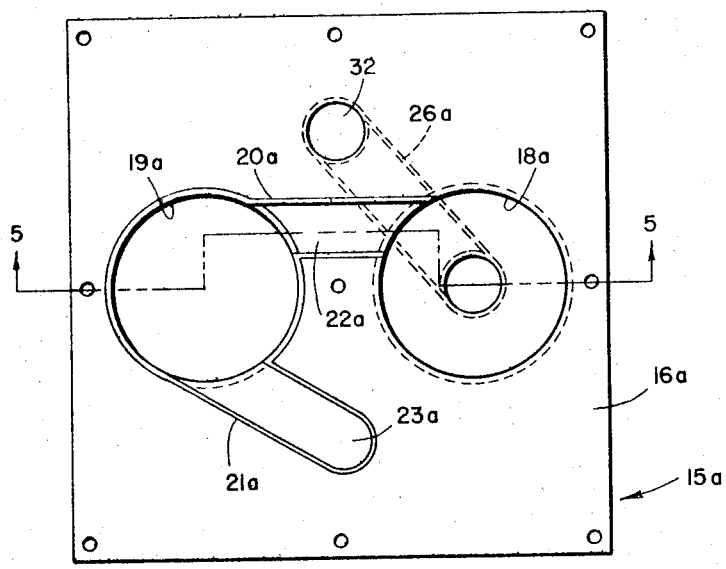
Figure 5:
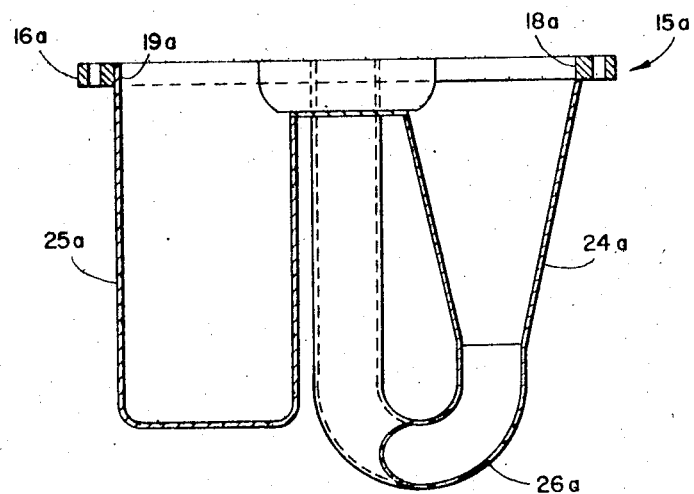

Other objects and advantages will become apparent in the following specification when taken in light of the attached drawings in which:

FIGURE 1 is a side elevation of the invention;
FIGURE 2 is a top plan view of the preferred form of the invention;
FIGURE 3 is a vertical cross section taken on line 3—3 of FIGURE 2 looking in the direction of the arrows;
FIGURE 4 is a top plan view of a modified form of the invention;
FIGURE 5 is a vertical cross section taken on line 5—5 of FIGURE 4 looking in the direction of the arrows;
FIGURE 6 is a front elevation of another modified form of the invention;
FIGURE 7 is a side elevation of the structure shown in FIGURE 6; and
FIGURE 8 is a top plan view of the structure shown in FIGURE 6.

Referring now to the drawings in detail wherein like reference characters indicate like parts throughout the several figures, the reference numeral 10 indicates generally an apparatus constructed in accordance with the invention.

In the use of glass electrodes for measuring pH a high mortality rate is normally experienced in prior art systems due to several factors, among which are, coating of the electrode by the material under test and abrasion of the outer surface of the glass electrode with a resulting change in the measuring characteristics of the electrode. The apparatus 10 is a pH electrode pot which maintains a conventional glass electrode 11 in contact with a slurry to be measured and a reference electrode 12 in contact with the same slurry. The glass electrode 11 and the reference electrode 12 are of completely conventional design and operate in a conventional manner to measure the pH of a slurry passed thereover. The slurry being measured and controlled normally is a suspension of solids in liquid with both fine and coarse particles of relatively abrasive solids being present. With a slurry of this type in prior art apparatus the speed of movement of the slurry must be precisely controlled since if too slow coating will occur or if too fast abrasive scouring occurs.

With the present invention the electrodes 11, 12 are maintained immersed at all times in the slurry and the coarse particles are kept out of contact with the glass electrode 11 while the fine particles are used to clean the coating from the glass electrode 11 as rapidly as it forms without undue abrasion of the glass surface.

The apparatus 10 is mounted on the top 13 of a process tank 14 and has a generally rectangular flat support 15. The support 15 has a lower plate 16 and an upper plate 17 which are secured together in sealed relation. The lower plate 16 has a circular opening 18 formed therein adjacent one side thereof and a second circular opening 19 adjacent the opposite side thereof. An elongated openings 20 intersects the opening 18 tangentially and an elongated opening 21 intersects the opening 19 tangentially.

A trough 22 underlies the lower plate 16 and has its opposite side edges secured in sealed relation to the opposite side edges of the elongated opening 20. A second trough 23 underlies the lower plate 16 and has its opposite side edges secured in sealed relation to the opposite side edges of the elongated opening 21. A downwardly and inwardly tapering conical pot 24 is secured at its upper edge to the lower plate 16 along the edge of the circular opening 18. The trough 22 at one end intersects the pot 24 and is secured thereto in sealed relation.

A generally cylindrical container 25 is secured at its upper edge to the lower plate 16 along the edge of the circular opening 19. The trough 23 at one end intersects the container 25 and is secured thereto in sealed relation.

A generally U-shaped tube 26 connects the center of the lower end of the pot 24 with the center of the lower end of the container 25. A conduit 27 is secured to the upper plate 17 in a position communicating with the trough 22 at the end thereof opposite the pot 24. The opposite end of the conduit 27 extends to an intake point to receive slurry to be tested.

A conduit 28 is secured to the upper plate 17 in a position communicating with the trough 23 at the end thereof opposite the container 25. The opposite end of the conduit 28 is positioned for discharge into the process tank 14.

The upper plate 17 when secured in sealed relation to the lower plate 16 forms with the trough 22 a conduit connecting the conduit 27 to the pot 24. The upper plate 17 also in like manner forms with the trough 23 a conduit connecting the conduit 28 to the container 25.

The glass electrode 11 extends into the pot 24 through a seal 29 sealing the electrode 11 to the upper plate 17. The reference electrode extends similarly through the upper plate 17 and into the container 25.

A vent opening 30 is formed in the conduit 27 overlying a port 31 leading into the process tank 14. The opening 30 will prevent siphoning of the slurry out of the pot 24 and container 25 when the system is at rest or negative pressure occurs in the conduit 27.

In the use and operation of the preferred form of the invention illustrated in FIGURES 1 through 3, slurry is pumped from a desired point in a process by a pump (not shown) through a conduit 27. The slurry flows through the trough 22 tangentially into the pot 24. The slurry is given a swirling spiral motion downwardly in the pot 24 flowing outwardly through the tube 26, into the container 25 and over the reference electrode 12. The slurry then passes through trough 23 to conduit 28 and thence to the process tank 14.

The swirling motion of the slurry in the pot 24 has a two-fold result. First, the heavier particles are moved to the outside of the pot 24 by centrifugal force so that they do not come in contact with the glass electrode 11. Second, the swirling motion creates a system in which the slower moving material is at the center in contact with the glass electrode 11 with the faster moving material out of contact with the glass electrode 11. With this action the slower moving fine particles in the slurry will scrub the coating from the glass electrode 11 at approximately the same rate that it is deposited, keeping the electrode 11 clean and accurate. The coarse particles being thrown to the outside fail to unduly abrade the glass electrode 11 and hence the life of the electrode 11 is materially increased.

In the modified form of the invention illustrated in FIGURES 4 and 5 the general arrangement is the same as the preferred form of the invention except that the flow moves through the container 25a before moving through the pot 24a.

A support 15a has a lower plate 16a of a flat generally rectangular shape. A circular opening 18a is formed in the lower plate 16a adjacent one side thereof and a second circular opening 19a is formed therein adjacent the opposite side thereof. An elongated opening 20a in the lower plate 16a intersects tangentially the opening 18a at one end and the opening 19a at the opposite end. An elongated opening 21a in the lower plate 16a intersects tangentially the opening 19a at one end thereof.

A trough 22a is positioned beneath the elongated opening 20a and has its opposite side edges secured in sealed relation to the opposite side edges of the opening 20a. A trough 23a is positioned beneath the opening 21a and has its opposite side edges secured in sealed relation to the opposite side edges of the opening 21a.

A pot 24a of downwardly and inwardly tapering conical shape has its upper edge secured to the edge of the circular opening 18a. A generally cylindrical container 25a has its upper edge secured to the edge of the circular opening 19a. The trough 22a is connected to the pot 24a at one end and to the container 25a at the opposite end establishing communication therebetween.

A tube 26a extends from the bottom of the pot 24a to an opening 32 in the lower plate 16a. The trough 23a extends to a point opposite the opening 32 and is adapted for connection to an inlet conduit (not shown). The opening 32 is adapted for connection to an outlet conduit (not shown) so that slurry may flow through the apparatus in the same manner as in the preferred form of the invention with the exception that the slurry passes through the container 25a and then through the pot 24a rather than the reverse. While not shown in FIGURES 4 and 5 an upper plate identical to the upper plate 17 is used with the modified form of the invention.

In the modified form of the invention illustrated in FIGURES 6 through 8 a generally cylindrical pot 24b is positioned in spaced apart parallel relation to a container 25b. A tube 26b extends from the pot 24b to the container 25b connecting them for flow therebetween. The tube 26b intersects the pot 24b tangentially and also intersects the container 25b tangentially.

An inlet tube 22b intersects the upper end of the pot 24b tangentially and communicates with the interior thereof. An outlet tube 23b intersects the upper end of the container 25b tangentially and communicates with the interior thereof. An electrode holder socket 29b is mounted on the top of the pot 24b and a second electrode holder socket 33b is mounted on the top of the container 25b.

The modified form of the invention illustrated in FIGURES 6 through 8 is used in the same general manner as the preferred form of the invention with the slurry flowing into the pot 24b through the inlet tube 22b. The slurry moves spirally downwardly in the pot 24b due to the tangential relationship of the inlet tube 22b and the tube 26b. The slurry is also moved spirally through container 25b due to the tangential relationship of the tubes 26b, 23b to the container 25b.

In all forms of the invention the action of the slurry on the glass electrode is the same and the life of the electrode is materially extended.

Having thus described the preferred embodiments of the invention it should be understood that numerous structural modifications may be resorted to without departing from the scope of the appended claim.

I claim:

1. Apparatus for measuring the hydrogen ion concentration of a slurry stream containing abrasive solids suspended therein, comprising:
  (a) support means,
  (b) a conical pot having a generally circular cross-section secured to said support means in depending relation thereto,
  (c) a hydrogen ion concentration measuring means including a glass electrode suspended in said slurry stream from said support means centrally of and at one end of said pot in spaced relation to the walls of said pot,
  (d) outlet means extending from the end of said pot opposing the end of said pot in which said electrode is suspended,
  (e) inlet means tangentially positioned with respect to the end of said pot in which said glass electrode is suspended to produce a spiraling flow of said slurry stream tangential to and about said glass electrode whereby the heavier, faster moving, more abrasive solids of said slurry stream are moved by centrifugal force to the periphery of said pot and out of contact with said glass electrode while at least a portion of the slower moving, finer particles of said abrasive solids of said slurry stream are maintained for a time in cleaning contact with said glass electrode as the slurry stream spirals through said conical pot to said outlet means,
  (f) a container depending from said support means,
  (g) a reference electrode means supported centrally of said container, and
  (h) conduit means connecting said container with said outlet means of said pot whereby said slurry stream flowing past said glass electrode also flows past said reference electrode.

References Cited

UNITED STATES PATENTS

| 2,108,293 | 2/1938 | Perley | 204—195.1 |
| 2,186,727 | 1/1940 | Martin et al. | 204—195.1 |
| 3,188,565 | 6/1965 | Kolb | 324—61 |

FOREIGN PATENTS 714,642  9/1954  Great Britain.

JOHN H. MACK, Primary Examiner

T. TUNG, Assistant Examiner

U.S. Cl. X.R.

23—253; 324—30